| (12) | United States Patent | (10) Patent No.: | US 9,584,544 B2 |
|---|---|---|---|
| | Botzer | (45) Date of Patent: | Feb. 28, 2017 |

(54) SECURED LOGICAL COMPONENT FOR SECURITY IN A VIRTUAL ENVIRONMENT

(71) Applicant: Red Hat Israel, Ltd., Ra'anana (IL)

(72) Inventor: David Botzer, Kfar Yona (IL)

(73) Assignee: Red Hat Israel, Ltd., Ra'anana (IL)

( * ) Notice: Subject to any disclaimer, the term of this patent is extended or adjusted under 35 U.S.C. 154(b) by 402 days.

(21) Appl. No.: 13/795,275

(22) Filed: Mar. 12, 2013

(65) Prior Publication Data

US 2014/0282813 A1    Sep. 18, 2014

(51) Int. Cl.
*H04L 29/06*    (2006.01)
*G06F 21/55*    (2013.01)

(52) U.S. Cl.
CPC .......... *H04L 63/20* (2013.01); *G06F 21/552* (2013.01)

(58) Field of Classification Search
CPC ...................................................... H04L 63/20
See application file for complete search history.

(56) References Cited

U.S. PATENT DOCUMENTS

| 8,250,641 B2* | 8/2012 | Morgan et al. .................. 726/11 |
| 8,261,317 B2* | 9/2012 | Litvin et al. ....................... 726/1 |
| 8,352,584 B2* | 1/2013 | Franklin ......................... 709/223 |
| 8,429,650 B2* | 4/2013 | Ferwerda et al. ................ 718/1 |
| 8,667,146 B2* | 3/2014 | Agarwal et al. .............. 709/228 |
| 8,701,167 B2* | 4/2014 | Kovalan ............................. 726/5 |
| 2007/0204166 A1* | 8/2007 | Tome et al. .................... 713/182 |
| 2008/0141338 A1 | 6/2008 | Kim et al. |
| 2009/0077552 A1* | 3/2009 | Sekiguchi ........... G06F 9/45558 718/1 |
| 2009/0158385 A1 | 6/2009 | Kim et al. |
| 2009/0271844 A1 | 10/2009 | Zhang et al. |
| 2010/0067699 A1* | 3/2010 | Bradley et al. ................ 380/277 |
| 2010/0132011 A1 | 5/2010 | Morris et al. |
| 2010/0162240 A1 | 6/2010 | Zhang et al. |
| 2011/0023104 A1* | 1/2011 | Franklin .......................... 726/11 |
| 2011/0296234 A1* | 12/2011 | Oshins ................ G06F 9/45558 714/5.11 |
| 2012/0096524 A1* | 4/2012 | Kovalan ............................ 726/5 |
| 2012/0110636 A1* | 5/2012 | Van Biljon et al. .............. 726/1 |
| 2012/0110650 A1* | 5/2012 | Van Biljon et al. .............. 726/4 |
| 2012/0110651 A1* | 5/2012 | Van Biljon et al. .............. 726/4 |
| 2012/0185913 A1* | 7/2012 | Martinez et al. .................. 726/1 |
| 2012/0240182 A1* | 9/2012 | Narayanaswamy et al. ..... 726/1 |
| 2013/0227641 A1* | 8/2013 | White et al. ....................... 726/1 |
| 2013/0227646 A1* | 8/2013 | Haggerty et al. ................. 726/3 |
| 2013/0290954 A1* | 10/2013 | Dorland et al. ................... 718/1 |
| 2013/0298182 A1* | 11/2013 | May .................................. 726/1 |
| 2014/0003249 A1* | 1/2014 | Cai ................................. 370/241 |
| 2014/0026231 A1* | 1/2014 | Barak et al. .................... 726/29 |

(Continued)

*Primary Examiner* — Mahfuzur Rahman
*Assistant Examiner* — Carlos Amorin
(74) *Attorney, Agent, or Firm* — Haynes and Boone, LLP

(57) ABSTRACT

A system and method for providing security in a virtual environment are provided. An example system includes a link module that links a secured logical component to a logical entity including a set of virtual machines. The example system also includes a security module that identifies a set of security policies for one or more communications to the logical entity or one or more communications from the logical entity. The example system further includes a control module that controls, based on the set of security policies, the one or more communications to the logical entity or the one or more communications from the logical entity.

17 Claims, 6 Drawing Sheets

(56) References Cited

U.S. PATENT DOCUMENTS

| | | |
|---|---|---|
| 2014/0053226 A1* | 2/2014 | Fadida et al. .................... 726/1 |
| 2014/0075494 A1* | 3/2014 | Fadida et al. .................... 726/1 |
| 2014/0075499 A1* | 3/2014 | Arun et al. ....................... 726/1 |
| 2014/0082699 A1* | 3/2014 | Eicken et al. .................... 726/4 |
| 2014/0112205 A1* | 4/2014 | Prakash et al. ............... 370/256 |
| 2014/0149981 A1* | 5/2014 | Luxenberg et al. ............. 718/1 |
| 2014/0189684 A1* | 7/2014 | Zaslavsky et al. .............. 718/1 |
| 2014/0245423 A1* | 8/2014 | Lee ................................ 726/12 |

* cited by examiner

SECURED LOGICAL COMPONENT FOR SECURITY IN A VIRTUAL ENVIRONMENT

BACKGROUND

The present disclosure generally relates to a virtual environment, and more particularly to security in a virtual environment.

A firewall may provide a barrier between a network and the outside world. For example, in an organizational setting, a dedicated firewall may be placed between the organization's network and the outside world. A security administrator in the organization may be tasked with deciding how to implement the firewall. The security administrator may place a router that has built-in firewall capabilities between the organization's network and the outside world. Alternatively, the security administrator may place a server that is dedicated solely to running firewall software. Some operating systems may include built-in packet-filtering capabilities, and the security administrator may decide to install this operating system on the dedicated server. The security administrator may buy the server, and install and configure the proper software on the server.

As organizations move their assets into the cloud and the use of virtual environments by organizations increase, the above mentioned technique of deploying a firewall may not suffice to secure a virtual environment. For example, in a non-virtualized environment each server in a network may be connected to a unique switch that is then routed into the firewall. The servers may be physically segregated from each other and the only point of connectivity between the servers may be via the physical firewall. In a virtualized environment, however, many virtual machines may reside in a host machine. A virtual machine is a portion of software that, when executed on appropriate hardware, creates an environment allowing the virtualization of certain functionality of a physical computer system. A virtual machine may function as a self-contained platform, running its own operating system (OS) and software applications (processes). A malicious user may break out of a virtual machine and compromise the host machine.

Further, integrating the firewall into the virtual environment may be difficult. A security administrator may be tasked with configuring the firewall and the virtual machines running on the host machine to use the firewall. This may be a manual process that proves to be tedious and time consuming. Additionally, moving the firewall may also be a tedious and time consuming process.

BRIEF SUMMARY

This disclosure relates to security in a virtual environment. Methods, systems, and techniques for providing security in a virtual environment are disclosed.

According to an embodiment, a system for providing security in a virtual environment includes a link module that links a secured logical component to a logical entity including a set of virtual machines. The system also includes a security module that identifies a set of security policies for one or more communications to the logical entity or one or more communications from the logical entity. The system further includes a control module that controls, based on the set of security policies, the one or more communications to the logical entity or the one or more communications from the logical entity.

According to another embodiment, a method of providing security in a virtual environment includes linking, by one or more processors, a secured logical component to a logical entity including a set of virtual machines. The method also includes identifying a set of security policies for one or more communications to the logical entity or one or more communications from the logical entity. The method further includes controlling, based on the set of security policies, the one or more communications to the logical entity or the one or more communications from the logical entity.

According to another embodiment, a non-transitory machine-readable medium including a plurality of machine-readable instructions that when executed by one or more processors is adapted to cause the one or more processors to perform a method including linking a secured logical component to a logical entity including a set of virtual machines; identifying a set of security policies for one or more communications to the logical entity or one or more communications from the logical entity; and controlling, based on the set of security policies, the one or more communications to the logical entity or the one or more communications from the logical entity.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

I. Overview
II. Example System Architectures
   A. Secured Logical Component Linked to Two Clusters
     1. Link to a Logical Entity
     2. Security Policies
     3. Control Communications Associated with the Logical Entity Based on the Security Policies
   B. Secured Logical Component Linked to a Datacenter and a Network
   C. Secure Communication via a Virtual Private Network
III. Example Implementations of Secured Logical Component
IV. Example Method
V. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

This disclosure provides techniques to secure a virtual environment. In an embodiment, a secured logical component may be provided to secure the virtual environment. The secured logical component may be linked to one or more logical entities and may include a set of security policies for one or more communications associated with each logical entity based on the set of security policies. The secured logical entity may control communications associated with each linked logical entity. In an example, the secured logical component prevents unauthorized (e.g., unsecure or unencrypted) traffic from being sent from or to the linked logical entity.

II. Example System Architectures

A. Secured Logical Component Linked to Two Clusters

Figure 1:
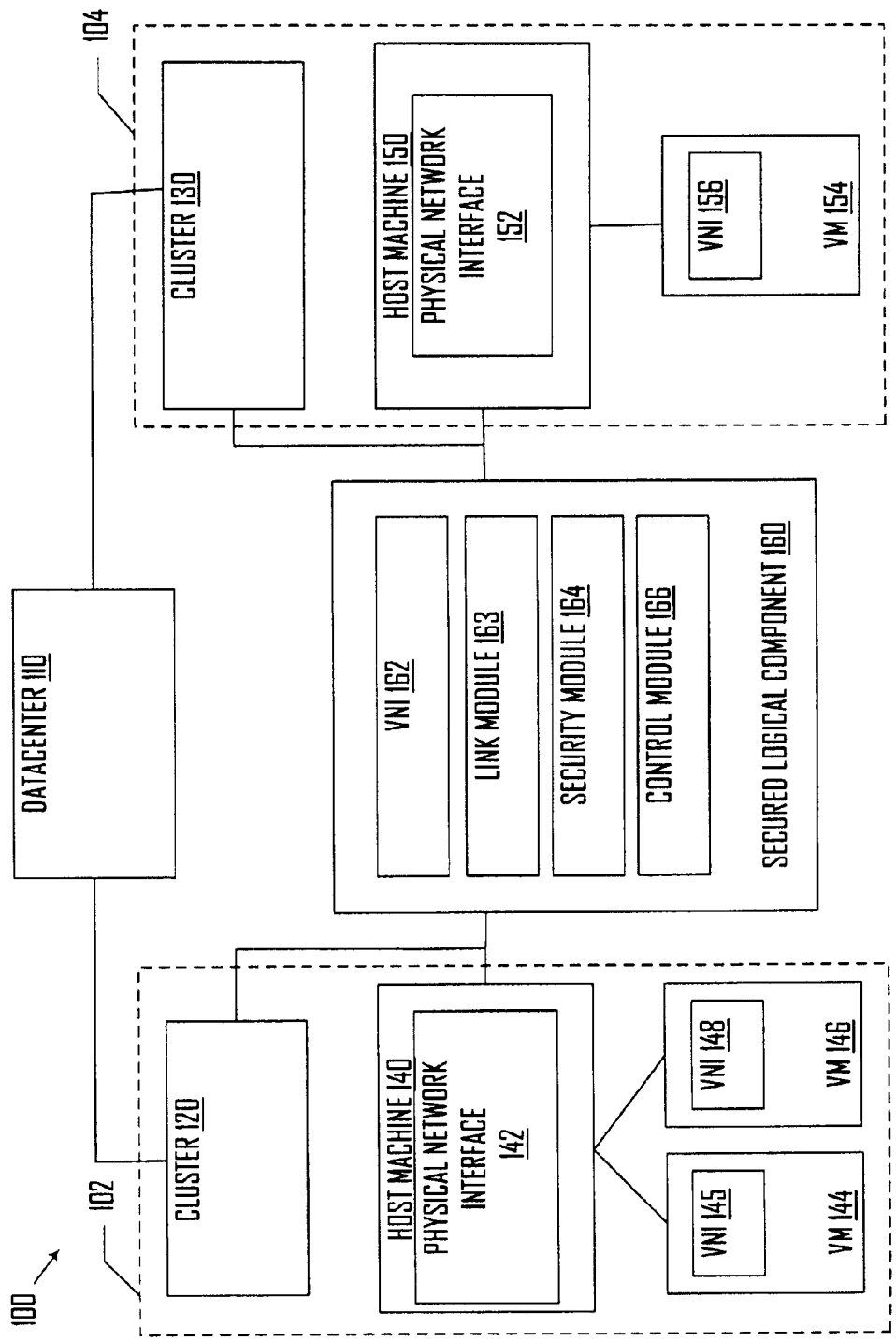
FIG. 1 is a simplified block diagram illustrating a system for providing security in a virtual environment, according to an embodiment.

FIG. 1 is a simplified block diagram illustrating a system 100 for providing security in a virtual environment, according to an embodiment.

System 100 includes a datacenter 110. A datacenter is a logical entity that may include physical and logical resources within a managed virtual environment. The datacenter may include a logical grouping of clusters of hosts. The datacenter may be associated with a physical site that includes the clusters of hosts that are connected to a network. When the datacenter is created, a user may assign a name to the datacenter.

After a datacenter is created, one or more clusters may be assigned to the datacenter. Datacenter 110 includes clusters 120 and 130. Clusters 120 and 130 belong to datacenter 110. A cluster is a collection of physical hosts that may share similar attributes. For example, hosts belonging to a cluster may share the same storage domains and have the same type of central processing unit (CPU). In an example, cluster 120 may include Research and Development (R&D) hosts and cluster 130 may include Quality Assurance (QA) hosts of a company. When the cluster is created, a user may assign a name to the cluster.

After a cluster is created, one or more host machines may be assigned to the cluster. Cluster 120 includes a host machine 140, and cluster 130 includes a host machine 150. Host machine 140 is assigned to cluster 120, and host machine 150 is assigned to cluster 130. Host machine 140 includes a physical network interface 142 that may be used to send or receive data over a network. Similarly, host machine 150 includes a physical network interface 152 that may be used to send or receive data over a network.

A host machine may run one or more virtual machines that run applications and services. Host machine 140 includes a virtual machine (VM) 144 and VM 146. VM 144 includes a virtual network interface (VNI) 145, and VM 146 includes a VNI 148. VNIs 145,148 may be associated with physical network interface 142 such that if VMs 144, 146 running on host machine 140 send a communication to a different host or over the Internet, the communication may be sent via physical network interface 142. VMs 144 and 146 may also communicate with each other using physical network interface 142. Similarly, host machine 150 includes a VM 154 including a VNI 156. VNI 156 may be associated with physical network interface 152 such that if VM 154 running on host machine 150 sends a communication to a different host or over the Internet, the communication may be sent via physical network interface 152. A user may create a VM and assign the VM to a datacenter and cluster, and may request an amount of memory for the VM, request a quantity of CPUs, and a quantity of VNIs.

During the host installation process, a logical network may be created and used to, for example, segregate VM traffic or isolate traffic between groups of VMs in a cluster. Datacenter 110 may be associated with the logical network (e.g., the defined subnets for management, guest network traffic, and storage network traffic). In an example, the logical network is a named set of global network connectivity properties in datacenter 110. Additionally, the logical network may be assigned as a resource of a cluster in datacenter 110, and all hosts in the cluster may have the same logical network implemented. The logical network may be used as a bridge to the VMs running on the host machine. For example, the network traffic that goes to or from VMs 144 and 146 may pass through physical network interface 142. Further, VM 144 may communicate with VM 146 via physical network interface 142 and VNIs 145 and 148.

1. Link to a Logical Entity

The logical network may be attached to the host machines belonging to a cluster. In an example, the logical network may be linked to the physical network interfaces of the one or more host machines in the cluster. For instance, the logical network may be linked to physical network interface 142 of host machine 140 in cluster 120 and may also be linked to physical network interface 152 of host machine 150 in cluster 130.

The logical network may be used as a bridge to the VMs running on the host machines. The bridge may be a virtual configuration. Moreover, the logical network may be linked to the one or more virtual network interfaces of the one or more VMs running in the cluster. The VM may include one or more VNIs assigned to the logical network, enabling the VM to communicate with other VMs running on the host machine, other host machines, and/or over the Internet. The VMs running on a host machine that is assigned to the logical network may communicate via the physical network interface of the host machine.

For instance, VNIs 145 and 148 of host machine 140 in cluster 120 may be assigned to the logical network, and VNI 156 of host machine 150 in cluster 130 may be assigned to the logical network. VMs 144, 146, and 154 may communicate with each other using their respective VNIs and physical network interface of the host machine in which the VMs are running.

System 100 also includes a secured logical component 160 that may be an independent component inserted into the virtual environment. Secured logical component 160 may be a centralized system that provides a secure environment for managing VMs in the virtual environment and runs in a cluster of a datacenter including the VMs. In an example, secured logical component 160 is linked between two logical entities, and controls, based on a set of security policies, communications between the logical entities. In another example, secured logical component 160 is linked between a logical entity and a network, and controls, based on a set of security policies, communications that are sent over the network to or from the logical entity. Secured logical component 160 may enable a set of security policies to be implemented with minimal administration and integrated into the virtual environment.

In an example, a logical entity may not have an IP address or a hostname similar to the way in which a physical machine (e.g., host machines 140 and 150) has an IP address or a hostname. The logical entity may refer to a container that includes the physical hosts assigned to the datacenter or cluster along with the one or more VMs running on the physical hosts.

Figure 2:
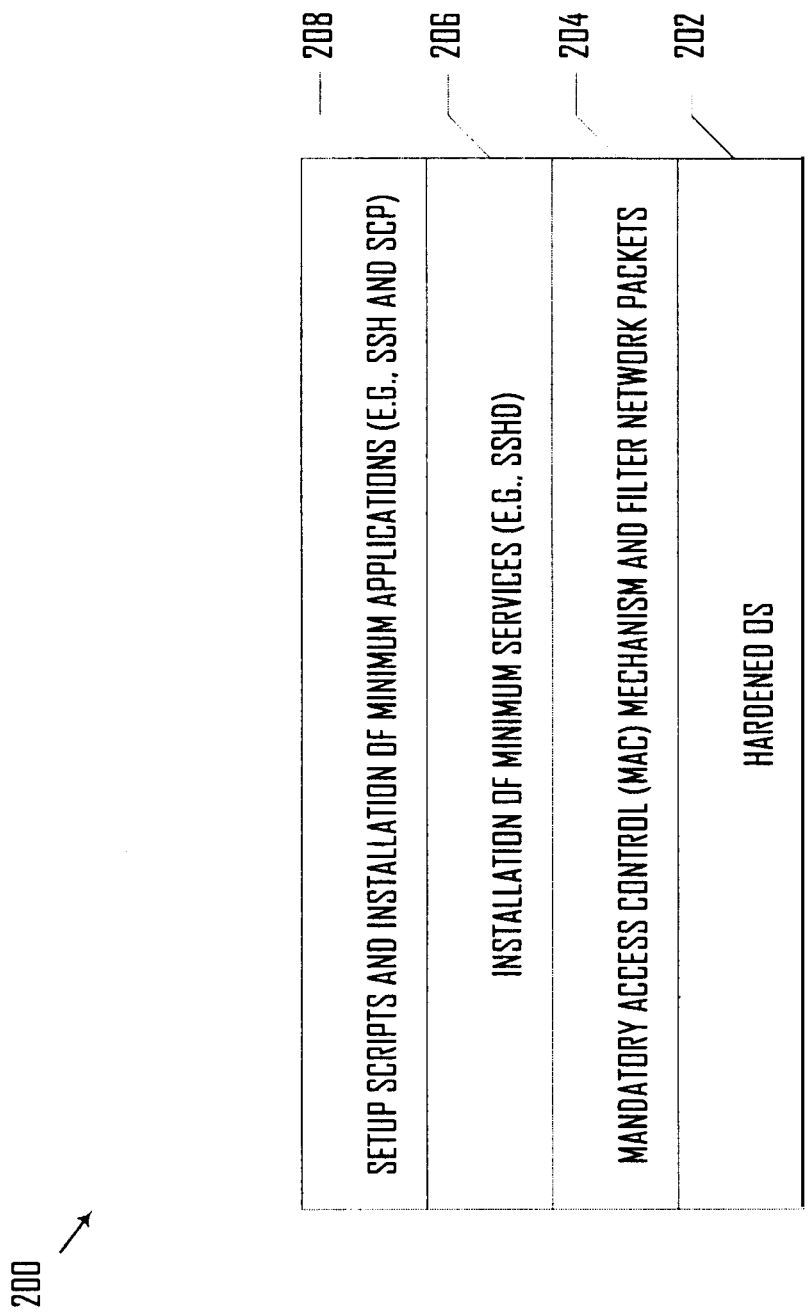
FIG. 2 is a simplified block diagram illustrating a software architecture of a secured logical component, according to an embodiment.

FIG. 2 is a simplified block diagram illustrating a software architecture 200 of a secured logical component, according to an embodiment.

Software architecture 200 includes four layers. A first layer 202 includes a hardened OS. Hardening an OS may refer to the process of making the environment more secure from attacks and intruders. In an example, hardening an OS may include disabling unnecessary services, installing minimum applications, protecting the management interface (and applications), adhering to solid authentication protection, and disabling unnecessary accounts. In an example, secured logical component 160 may run only the protocols needed to support secured logical component 160's functionality.

A second layer 204 includes a mandatory access control (MAC) and filter to filter network packets. MAC may be implemented in the kernel of the operation system. MAC may refer to a security mechanism that restricts the level of control that users (subjects) have over the objects that they create. MAC may assign labels, or categories, to all file system objects. Users and processes may require the appropriate access to these categories before they can interact with these objects. In an embodiment, RED HAT® SELINUX® may provide a MAC system implemented in the LINUX® kernel. SELINUX® may be installed and configured with features for maximum security. Trademarks are the property of their respective owners. Additionally, network packet filtering may refer to a process of controlling network packets as they enter, move through, and exit the network stack within the kernel. IPChains and IPTables are example tools that may be used for filtering network packets. In an example, IPTables is installed and preconfigured with a set of security policies.

A third layer 206 includes installation of minimum services. In an example, services that have a potential security risk may be prevented from being installed. Minimal services may be installed in secured logical component 160 to apply one or more security policies. In an example, the minimum number of services is running at the startup of secured logical component 160. In an example, Open Secure Shell Daemon (SSHD), a daemon program for Secure Shell (SSH), is running on startup of secured logical component 160. SSHD and SSH may provide secure encrypted communications between two untrusted hosts over an unsecure network. SSHD may listen for connections from clients and may fork a new daemon for each incoming communication. The forked daemons may handle key exchange, encryption, authentication, command execution, and data exchange. SSHD may be configured using command-line options or a configuration file.

A fourth layer 208 includes a setup script and installation of minimum applications. The setup script may allow the user to configure services, MAC, and filter network packets. Using setup scripts, the user may configure parameters of secured logical component 160. For example, the user may change the MAC mode and modify rules (e.g., adding or removing) that filter network packets. In an example, IPTables is used to filter network packets. A user may insert entries into IPTables using the script, and secured logical component 160 may apply the rules. The script may be used to write code to process a text file including a set of security policies and create IPTables rules based on the text file. IPTable may include IP addresses of other entities that have permissions to access VMs. In an example, the security administrator runs a script to customize the IPTables and MAC to define one or more security policies and the networking details. Accordingly, it may be unnecessary to use dynamic host configuration protocol (DHCP).

Additionally, applications that do not pose a security threat may be installed. In an example, SSH is installed. The SSH client may be a client for secure, encrypted communication, including file transfer, across networks. SSH may enable the user to access secured logical component 160 or to securely connect to a VM. Secure copy (SCP) may enable secure transfer of computer files between a local host and a remote host or between two remote hosts. SCP may enable the user to upload or download a security policy. In an example, a user may launch secured logical component 160, and a security policy may allow only this user (e.g., via a user interface or configuration file) to access secured logical component 160 and run one or more setup scripts to change one or more security features.

Referring back to FIG. 1, secured logical component 160 includes a VNI 162, link module 163, security module 164, and control module 166. Secured logical component 160 may be used as a security mechanism between two logical entities. Secured logical component 160 may communicate with host machines associated with the logical entity using the logical network associated with VNI 162. Network traffic associated with the logical entity may be received by secured logical component 160 via VNI 162. Security logical component 160 may run inside the virtual environment. In an embodiment, all traffic that is sent from or to VMs that are "protected" by secured logical component 160 pass through secured logical component 160 first before being routed. In this way, secured logical component 160 may ensure a secure environment.

In an embodiment, security logical component 160 is a VM that is launched in the virtual environment. For example, security logical component 160 may be a VM running on host machine 140. In this example, security logical component 160 may receive communications via physical network interface 142. As discussed below, it may be an easy process to migrate security logical component 160 such that it is running on host machine 150 rather than on host machine 140. After the migration, security logical component 160 may then receive communications via physical network interface 152. It may be desirable to migrate security logical component 160 under various circumstances. For example, if a lot of host machines are assigned to cluster 120 and cluster 130 is not busy, it may be desirable to migrate security logical component 160 from cluster 120 to cluster 130.

In an embodiment, link module 163 links secured logical component 160 to a logical entity including a set of virtual machines. The logical entity may be a datacenter, a cluster, or a virtual machine. In an example, link module 163 links secured logical component 160 to a logical entity 102 and a logical entity 104. Logical entity 102 may be cluster 120, and logical entity 104 may be cluster 130. To secure and control the network traffic associated with the linked logical entities, link module 163 may locate itself before the logical entity to which secured logical component 160 is linked. In this way, communications that are sent to or from the linked logical entity may first pass through secured logical component 160. Secured logical component 160 may then determine whether to forward the communication or discard the communication based on a set of security policies.

Link module 163 may link the logical network associated with the linked logical entity to VNI 162 of secured logical component 160. In an example, the logical network may be associated with clusters 120 and cluster 130. Accordingly, the logical network may be associated with host machine 140 (e.g., physical network interface 142) and host machine 150 (e.g., physical network interface 152). Link module 163 may link the logical network associated with host machines 140 and 150 to VNI 162 such that communications that are sent to or sent by host machines in clusters 120 and 130 pass through secured logical component 160 before being routed to their final destination.

Secured logical component 160 may be linked to one or more logical entities. Each logical entity linked to secured logical component 160 may be associated with a set of host machines running a set of virtual machines. In an example, link module 163 links secured logical component 160 to a first logical entity and links the logical network associated with the first logical entity to VNI 162. The first logical entity may be cluster 120, which is associated with a first set of host machines running a first set of VMs. The first set of host machines includes host machine 140 that is running VMs 144 and 146. The first set of host machines also includes a first set of physical network interfaces that is assigned to the logical network. The first set of physical network interfaces may include physical network interface 142. Each VM of the first set of VMs includes a VNI associated with the first set of physical network interfaces. Link module 163 may link the one or more VNIs of the first set of VMs to the logical network such that communications that are sent to or sent by the first set of VMs pass through secured logical component 160 before being routed to their final destination.

Similarly, link module 163 may link secured logical component 160 to a second logical entity and links the logical network associated with the second logical entity to VNI 162. The second logical entity may be cluster 130, which is associated with a second set of host machines running a second set of VMs. The second set of host machines includes host machine 150 that is running VM 154. The second set of host machines includes a second set of physical network interfaces that is assigned to the logical network. The second set of physical network interfaces may include physical network interface 152. Each VM of the second set of VMs includes a VNI associated with the second set of physical network interfaces. Link module 163 may link the one or more VNIs of the second set of VMs to the logical network such that communications that are sent to or sent by the second set of VMs pass through secured logical component 160 before being routed to their final destination.

2. Security Policies

In an embodiment, security module 164 identifies a set of security policies for one or more communications to the logical entity or one or more communications from the logical entity. In an example, cluster 120 is linked to secured logical component 160, and a set of security policies applies to the set of VMs that belong to cluster 120. Communications from or to the set of VMs may be protected by VNI 162. Secured logical component 160 may interpret the entities belonging to the logical component (e.g., IP address, hostname, and/or logical name).

Referring to the above example, if link module 163 links secured logical component 160 to cluster 120, security module 164 may identify a set of security policies for one or more communications to cluster 120 or one or more communications from cluster 120. Similarly, if link module 163 links secured logical component 160 to cluster 130, security module 164 may identify a set of security policies for one or more communications to cluster 130 or one or more communications from cluster 130.

In an embodiment, all communications from or to a VM that is running in a logical entity to which secured logical component 160 is linked may go through secured logical component 160. The set of security policies may reside in secured logical component 160. Security module 164 may filter incoming packets based on certain parameters such as, for example, packet size, source IP address, destination IP address, protocol, source port, and destination port.

In an example, the set of security policies is implemented via IPTables. The user may, for example, associate the set of security policies with a cluster name, with all of the VMs running in a particular cluster, and/or network IP address. For instance, the user may specify that the set of security policies may apply to all of the hosts assigned to a cluster. The user may specify the hosts that relate to the cluster, and secured logical component 160 may apply the set of security policies to the specified hosts. Different techniques to identify the hosts to which the set of security policies apply may be used.

For example, secured logical component 160 may departmentalize security groups (e.g., cluster 120 is used by the R&D department, and cluster 130 is used by the QA department) and a security policy may prevent network traffic from leaking into other departments. In another example, VM 144 may include one or more folders, and secured logical component 160 may include a security policy that allows VM 154 permission to access the folder based on the security policy. In another example, secured logical component 160 may prevent access to all attempts to access any VM running in cluster 120.

A user may edit the set of security policies to add, remove, or modify a security policy. In an example, the user edits the set of security policies via a graphical user interface (GUI). In another example, the user edits the set of security policies via a text file. For instance, the user may upload a security policy file. In keeping with our above example, the security policy file may be a premade security policy file that allows the R&D department to share a set of files with the QA department. A security administrator may set up an account to connect to secured logical component 160 and easily control access to files by specifying the set of security policies using secured logical component 160. This may provide advantages because it allows the user to easily modify security policies.

3. Control Communications Associated with the Logical Entity Based on the Security Policies In an embodiment, control module 166 controls, based on the set of security policies, the one or more communications to the logical entity or the one or more communications from the logical entity. Link module 163 may link secured logical component 160 to a first logical entity and a second logical entity. Security module 164 may identify the set of security policies for one or more communications between the first logical entity and the second logical entity, and control module 166 may control, based on the set of security policies, the one or more communications between the first logical entity and the second logical entity.

In an example, VM 154 may send a communication to VM 144. Before VM 144 receives the communication, the communication may be sent via physical network interface 142 to VNI 162, which may receive the communication specifying VM 154 as the source of the communication and VM 144 as the destination of the communication. Security module 164 may examine an incoming packet associated with the communication to VM 144. Security module 164 may identify a set of security policies for communications from the first logical entity associated with VM 154 to the second logical entity associated with VM 144. Control module 166 may determine whether to discard the incoming packet or allow the incoming packet based on the set of security policies. Control module 166 may route traffic to its destination based on the set of security policies.

Additionally, secured logical component 160 may provide scalability within a datacenter and control networking traffic directed to or from hosts associated with a logical entity. Secured logical component 160 may be used to control the network load so that network traffic does not overload any of the clusters. Further, secured logical component 160 may enable departmentalizing subnets, clusters, and datacenters in a way that is easily editable and may minimize costs incurred to provide security in a virtual environment. Secured logical component 160 may also be used to log security issues in the system.

Moreover, secured logical component 160 may be easily "moved" in the virtual environment. For example, secured logical component 160 may be unlinked from a logical entity and linked to another logical entity. For example, in FIG. 1, secured logical component 160 is linked to clusters 120 and 130. Secured logical component 160 may be easily moved such that secured logical component 160 is linked to cluster 130 and a different logical entity. A user may edit an association of VNI 162 to link secured logical component 160 to another entity.

In an example, link module 163 may unlink secured logical component 160 from the second logical entity and link secured logical component 160 to a third logical entity including a third set of virtual machines (not shown). Security module 164 may identify a second set of security policies for one or more communications between the first logical entity and the third logical entity. Control module 166 may control, based on the second set of security policies, one or more communications between the first logical entity and the third logical entity. In this example, the second logical entity may cease being "protected" by secured logical component 160.

In another example, link module 163 may unlink secured logical component 160 from the second logical entity and link secured logical component 160 to a network (e.g., Internet).

B. Secured Logical Component Linked to a Datacenter and a Network

Figure 3:
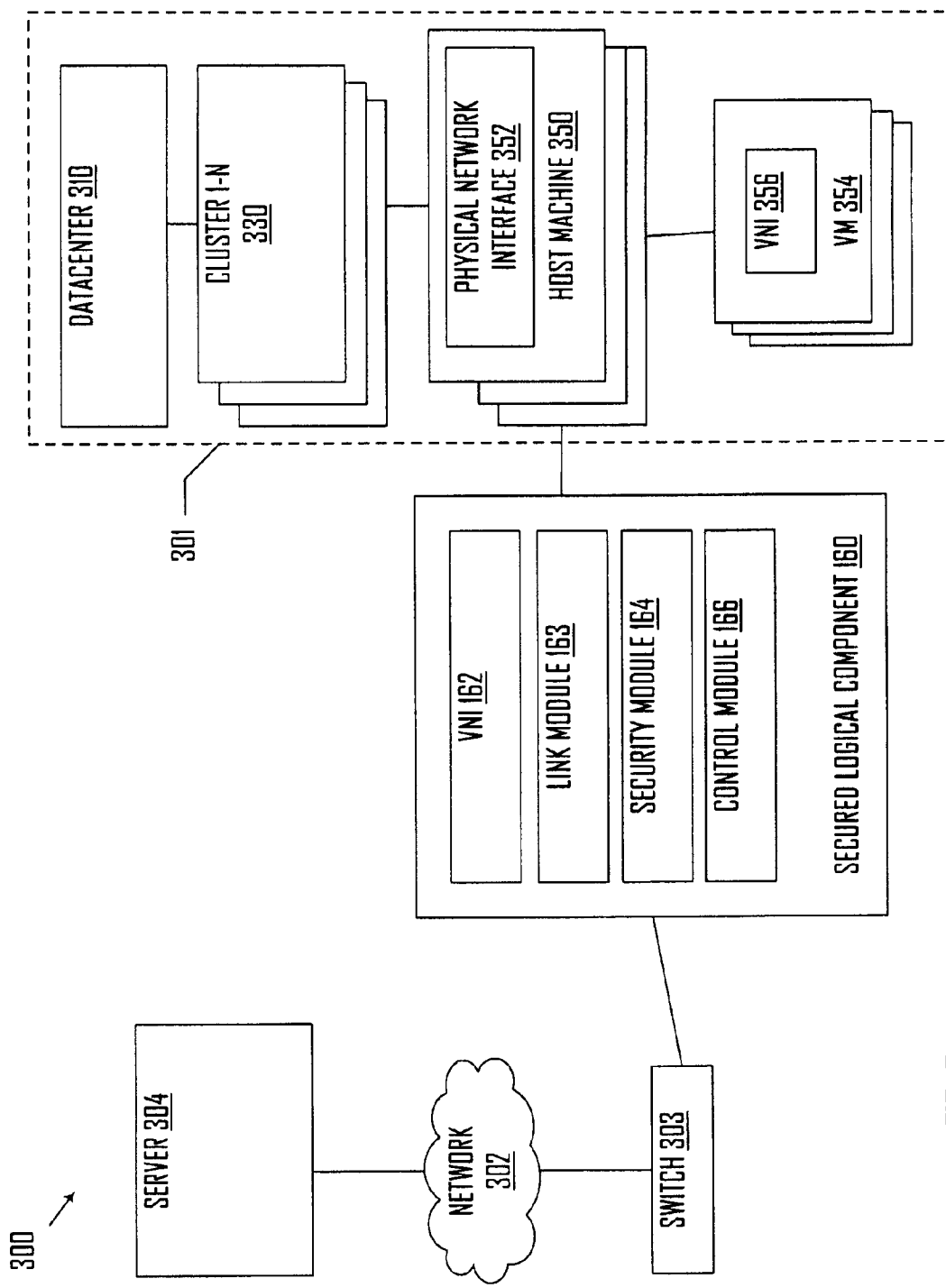
FIG. 3 is a simplified block diagram illustrating a system for providing security in a virtual environment, according to an embodiment.

FIG. 3 is a simplified block diagram illustrating a system 300 for providing security in a virtual environment, according to an embodiment.

System 300 includes secured logical component 160 linked to logical entity 301. Logical entity 301 may be datacenter 310. Datacenter 310 includes clusters 1-N 330 and each cluster of 1-N clusters may include one or more host machines. Each host machine may include a physical network interface 352 and may run one or more VMs 354. Each VM may include one or more VNIs 356.

Secured logical component 160 is coupled to a network 302 via a switch 303. Link module 163 may link secured logical component 160 to network 302 via switch 303. In an example, security module 164 identifies a set of security policies for one or more communications received via network 302 to logical entity 301 or one or more communications sent via network 302 from logical entity 301. Secured logical component 160 may identify communications received from switch 303 as being associated with the set of security policies. Control module 166 may control, based on the set of security policies, the one or more communications received via network 302 to logical entity 301 or the one or more communications sent via network 302 from logical entity 301.

Network 302 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

In an example, server 304 sends a communication over network 302 to VM 354. All traffic over network 302 that specifies VM 354 as the destination may be routed to secured logical component 160 before the communication is sent to VM 354. Secured logical component 160 may protect VM 354 and include a security policy. In an example, the security policy may specify that VM 354 should not receive user datagram protocol (UDP) packets over network 302. Accordingly, control module 166 may discard all UDP packets that specify VM 354 as the destination such that VM 354 does not receive any UDP Packets that were sent via network 302.

C. Secure Communication Via a Virtual Private Network

Datacenters may be located at different geographical sites. In an embodiment, secured logical component 160 may be linked to two datacenters that are in different geographical sites and may enable secure communications between the two datacenters via a virtual private network (VPN).

Figure 4:
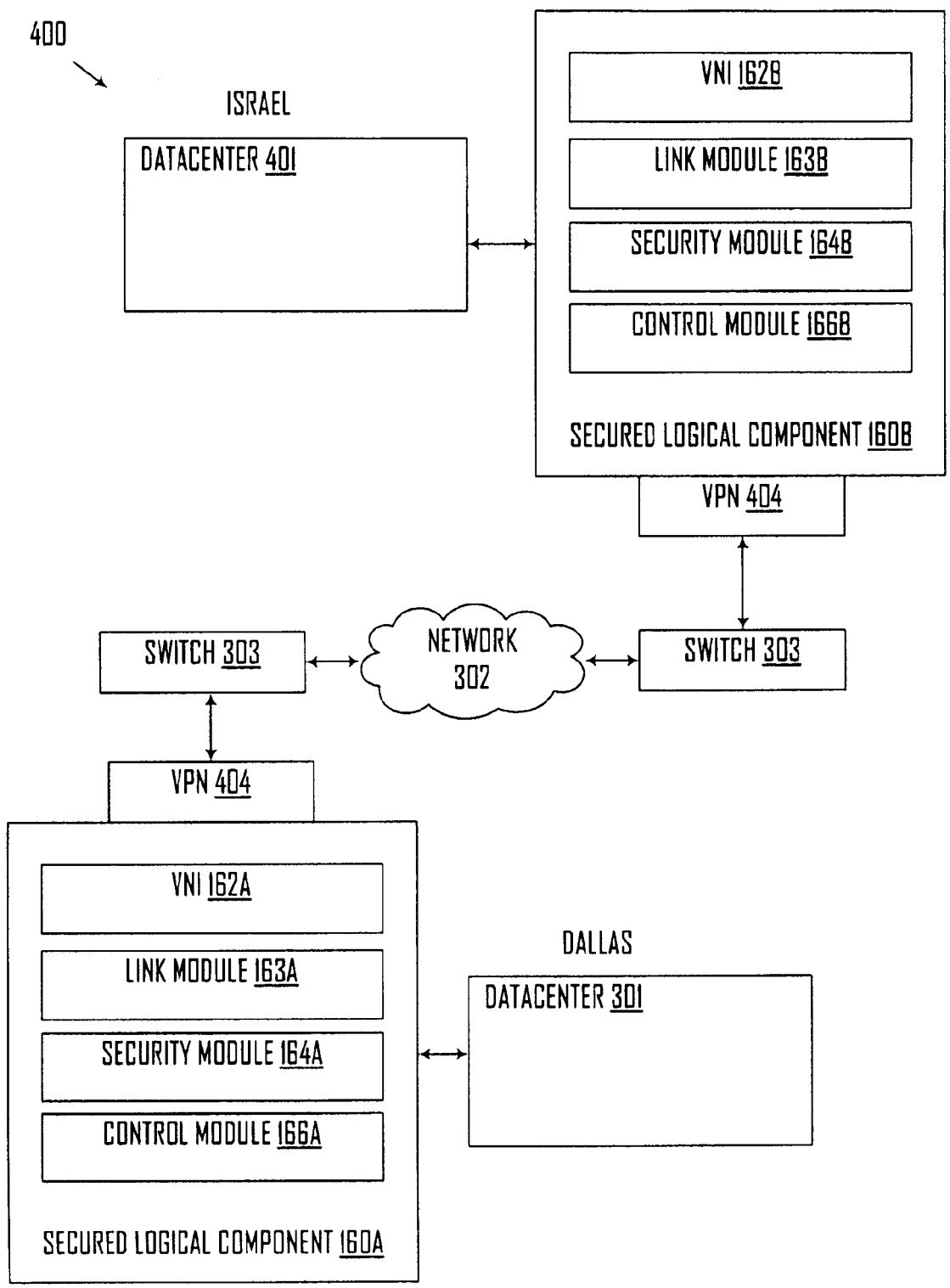
FIG. 4 is a simplified block diagram illustrating a system for providing security in a virtual environment, according to an embodiment.

FIG. 4 is a simplified block diagram illustrating a system 400 for providing security in a virtual environment, according to an embodiment.

System 400 includes a first security logical component 160A and a second security logical component 160B. Security module 160A includes VNI 162A, link module 163A, security module 164A, and control module 166A. Security logical component 160A may be linked to a first logical entity and a second logical entity. The first logical entity may be datacenter 301 in Dallas, and the second logical entity may be datacenter 401 in Israel. Link module 163A may link secured logical component 160A to datacenters 301 and 401. Datacenter 401 may be assigned to a cluster of host machines, each running one or more VMs.

Similarly, security module 160B includes VNI 162B, link module 163B, security module 164B, and control module 166B. Security logical component 160B may be linked to the first logical entity and the second logical entity. Link module 163B may link secured logical component 160B to datacenters 301 and 401.

A user may be provided with an option to enable a feature to create a VPN 404 between the datacenters. In this way, it may be unnecessary for the user to buy encryption software to encrypt communications between datacenter 301 to datacenter 401. In an example, the user may purchase a new key that enables encrypted communications between security logical components 160A and 160B.

Secured logical components 160A and 160B may establish via VPN 404 a secure connection and encrypt one or more communications between datacenters 301 and 401. In an example, security logical component 160A separates the traffic between datacenters 301 and 401 and all traffic from or to datacenters 301 and 401 first flows through security logical component 160A. Security logical component 160A may enable secure communication exchange with security logical component 160B by encrypting data from datacenter 301 sent to datacenter 401 and decrypting data from datacenter 401 sent to datacenter 301.

As discussed above and further emphasized here, FIGS. 1-4 are merely examples, which should not unduly limit the scope of the claims. For example, secured logical component 160 may be linked to one or more logical entities different from the example configurations shown in FIGS. 1, 3, and 4. In an example, secured logical component 160 may be linked to a first VM and a second VM. In this example, secured logical component 160 may control, based on a set of security policies, communications between the first and second VMs.

Further, although system 100 is described herein with reference to datacenter 110 including two clusters, datacenter 110 may include fewer than two or more than two clusters. Further, each of the clusters may include one or more host machines running one or more VMs without departing from the spirit and scope of the disclosure.

Further, it should be understood that one or more modules (e.g., link module 163, security module 164, and control module 166) in FIGS. 1 and 3 may be combined with another module. In an example, link module 163 and security module 164 are combined into a single module. It should also be understood that one or more modules in FIGS. 1 and 3 (e.g., link module 163, security module 164, and control module 166) may be separated into more than one module. In an example, control module 166 is split into a first control module and a second control module.

III. Example Implementations of Secured Logical Component

Secured logical component 160 may be launched in a variety of ways. In an embodiment, a user launches secured logical component 160 via a user interface. For instance, the user may launch secured logical component 160 via a one-click operation (e.g., with a "click of the mouse"). The user interface may request from the user which datacenter, clusters, and/or virtual machines to associate with secured logical component 160. The user may input a name of a data center, cluster, or virtual machine.

Secured logical component 160 may be treated as an entity different from a VM running on a host machine assigned to a cluster. For example, secured logical component 160 may be preconfigured such that it may include an operating system. In an embodiment, secured logical component 160 may run on a preconfigured virtual machine running on a host machine (not shown), and the preconfigured virtual machine may include the link module, security module, and control module. The preconfigured VM may be preconfigured to run an operating system (OS) without user selection of the operating system. In this way, it may be unnecessary for the user to install an OS in secured logical component 160. This may be in contrast to when a user initiates the launch of a VM running on host machine 140, at which point nothing may be installed on the VM yet. In particular, the VM may not yet include an OS, and the user may start from a blank canvas and requested to select an OS to install on the VM. Additionally, the VM may not yet include any applications, and the user may be requested to select which applications to install on the VM. In this way, time may be saved in providing a preconfigured secured logical component 160 in the virtual environment.

In an example, secured logical component 160 is based on a template and is preconfigured to run an OS based on the template. The template may include the OS and one or more applications preinstalled such that it is unnecessary for the user to select the OS or the one or more applications. In an example, secured logical component 160 is preconfigured to include the set of security policies (e.g., built-in IP tables) on it. In this way, the user may launch secured logical component 160 with one or more services running on secured logical component 160 and with the set of security policies intact.

Secured logical component 160 may be launched using an installation package (e.g., included in a compact disc) that a security administrator installs on a device. In another example, secured logical component 160 may be a standalone application that is downloaded from a Website. The security administrator may then install secured logical component 160 on any hardware, VM, or VM management product. Alternatively, secured logical component 160 may be implemented via code within the logical network. These examples are not intended to be limiting, and secured logical component 160 may be implemented in other ways.

IV Example Method

Figure 5:
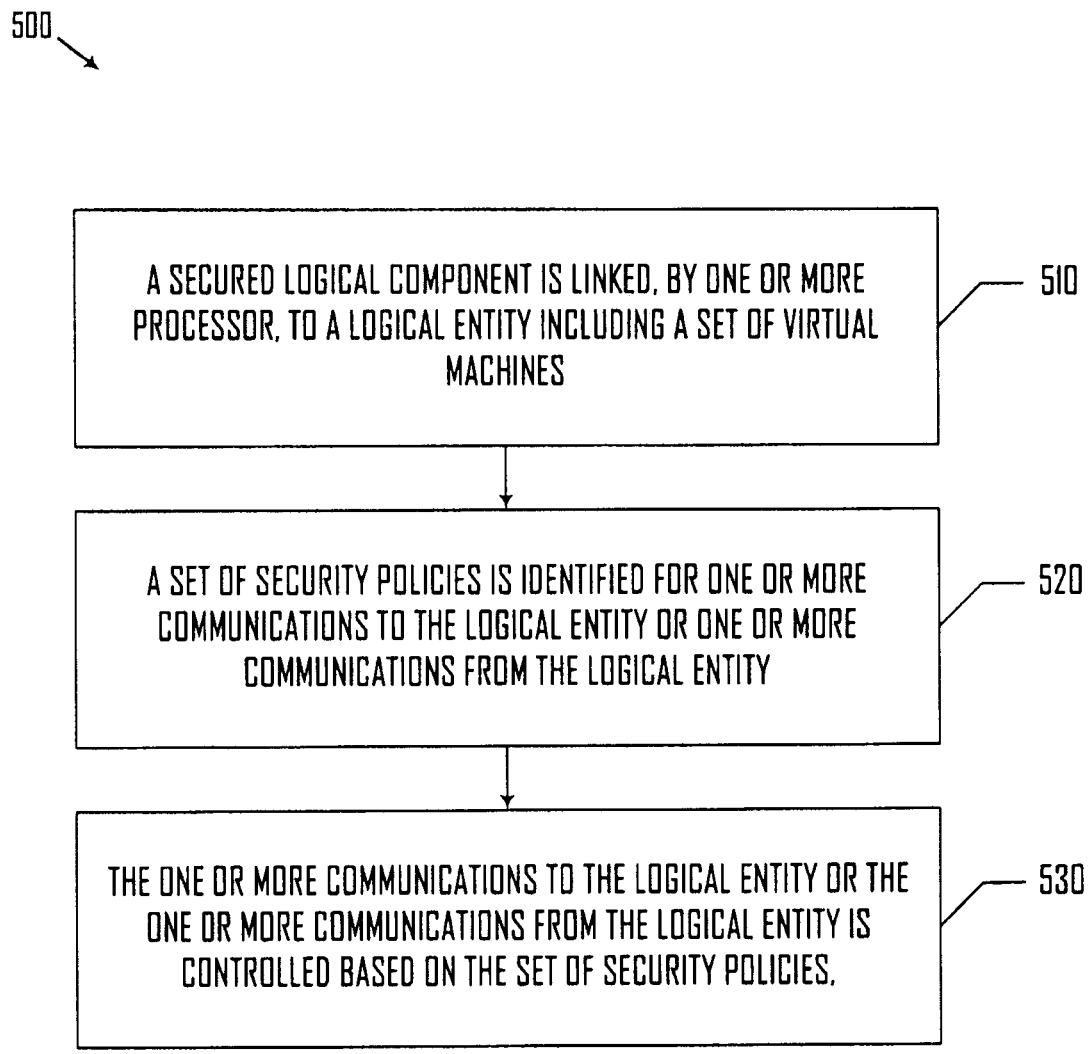
FIG. 5 is a simplified flowchart illustrating a method of providing security in a virtual environment, according to an embodiment.

FIG. 5 is a simplified flowchart illustrating a method 500 of providing security in a virtual environment, according to an embodiment. Method 500 is not meant to be limiting and may be used in other applications.

Method 500 includes steps 510-530. In a step 510, a secured logical component is linked, by one or more processors, to a logical entity including a set of virtual machines. In an example, link module 163 links, by one or more processors, a secured logical component to a logical entity including a set of virtual machines.

In a step 520, a set of security policies is identified for one or more communications to the logical entity or one or more communications from the logical entity. In an example, security module 164 identifies a set of security policies for one or more communications to the logical entity or one or more communications from the logical entity.

In a step 530, the one or more communications to the logical entity or the one or more communications from the logical entity is controlled based on the set of security policies. In an example, control module 166 controls, based on the set of security policies, the one or more communications to the logical entity or the one or more communications from the logical entity.

It is also understood that additional method steps may be performed before, during, or after steps 510-530 discussed above. It is also understood that one or more of the steps of method 500 described herein may be omitted, combined, or performed in a different sequence as desired.

V. Example Computing System

Figure 6:
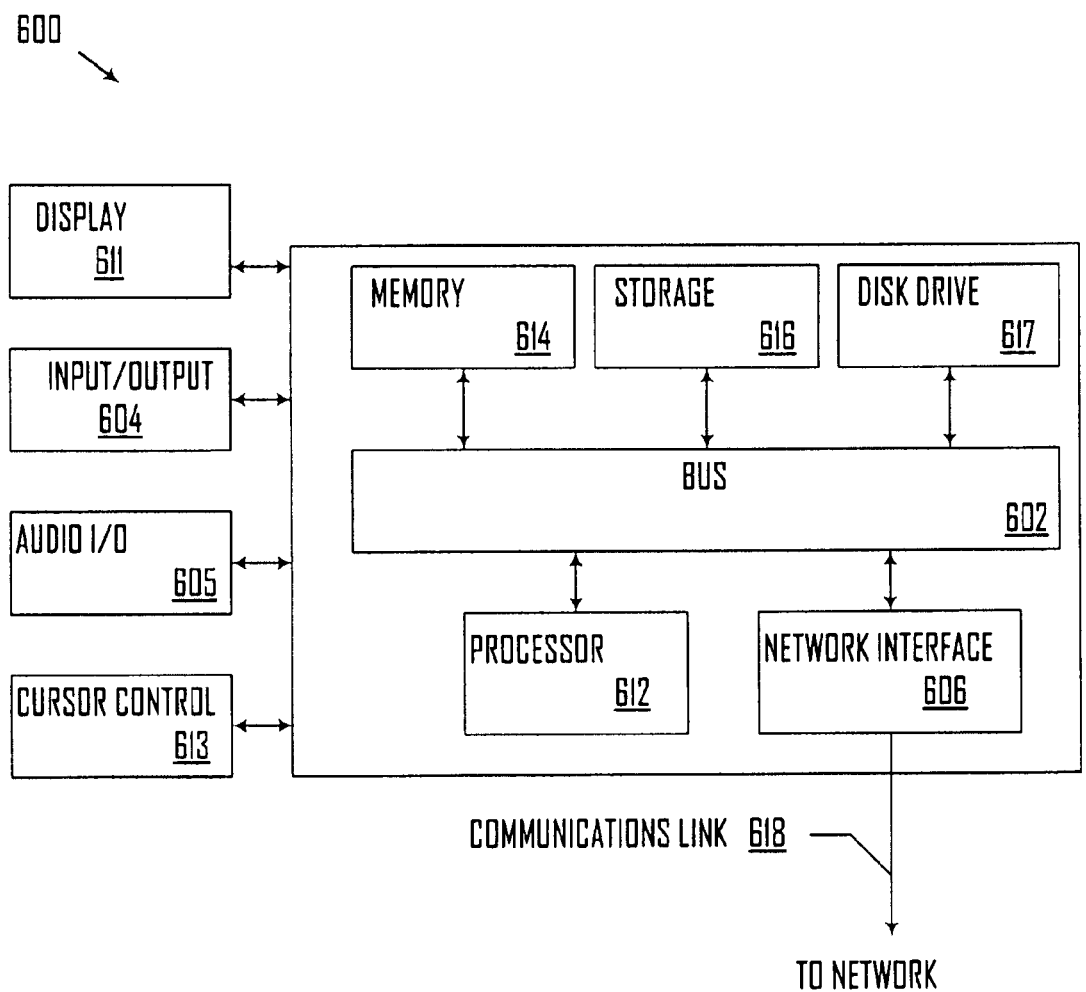
FIG. 6 is a block diagram of an electronic system suitable for implementing one or more embodiments of the present disclosure.

FIG. 6 is a block diagram of a computer system 600 suitable for implementing one or more embodiments of the present disclosure. In various implementations, secured logical component 160 may include one or more processors. Secured logical component 160 may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). An optional audio input/output component 605 may also be included to allow a user to use voice for inputting information by converting audio signals into information signals. Audio I/O component 605 may allow the user to hear audio. A transceiver or network interface 606 transmits and receives signals between computer system 600 and other devices via a communication link 618 to a network. In an embodiment, the transmission is wireless, although other transmission mediums and methods may also be suitable. A processor 612, which may be a microcontroller, digital signal processor (DSP), or other processing component, processes these various signals, such as for display on computer system 600 or transmission to other devices via communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A system for providing security in a virtualization environment, the system comprising: a link module that links a first secured logical component to a first logical entity including a first set of virtual machines, wherein the first secured logical component includes a network interface, and the link module links a logical network associated with the first logical entity to the network interface, links the first secured logical component to a second logical entity including a second set of virtual machines, and links the logical network associated with the second logical entity to the network interface, wherein the second logical entity is associated with a first set of host machines running the second set of virtual machines, wherein the first set of host machines includes a first set of physical network interfaces, and each virtual machine of the second set of virtual machines includes one or more first virtual network interfaces associated with the first set of physical network interfaces, and wherein the link module links the one or more first virtual network interfaces of the second set of virtual machines to the logical network, wherein the first logical entity is associated with a second set of host machines running the first set of virtual machines, wherein the second set of host machines includes a second set of physical network interfaces, and each virtual machine of the first set of virtual machines includes one or more second virtual network interfaces associated with the second set of physical network interfaces, wherein the link module links the one or more second virtual network interfaces of the first set of virtual machines to the logical network; a security module that identifies a set of security policies for one or more communications to the first logical entity or one or more communications from the first logical entity and that identifies a set of security policies for one or more communications between the first logical entity and the second logical entity; and a control module that controls, based on the set of security policies, the one or more communications to the first logical entity or the one or more communications from the first logical entity and that controls, based on the set of security the one or more communications between the first logical entity and the second logical entity, wherein the first secured logical component includes the link module, security module, and control module, wherein the first secured logical component runs on a virtual machine running on a host machine of the first set of host machines and receives communications via a physical network interface of the first set of physical network interfaces, wherein the virtual machine is migrated to a host machine of the second set of host machines, and after migration, the virtual machine receives communications via a physical network interface of the second set of physical network interfaces.

2. The system of claim 1, wherein the first secured logical component runs on a preconfigured virtual machine running on a host machine.

3. The system of claim 2, wherein the preconfigured virtual machine is preconfigured to run an operating system without user selection of the operating system.

4. The system of claim 1, wherein the link module unlinks the first secured logical component from the second logical entity and links the first secured logical component to a third logical entity including a third set of virtual machines, wherein the security module identifies a second set of security policies for one or more communications between the first logical entity and the third logical entity, and wherein the control module controls, based on the second set of security policies, one or more communications between the first logical entity and the third logical entity.

5. The system of claim 4, wherein the link module links the logical network associated with the third logical entity to the network interface, wherein the third logical entity is associated with a third set of host machines running the third set of virtual machines, wherein the third set of host machines includes a third set of physical network interfaces, and each virtual machine of the third set of virtual machines includes a third virtual network interface associated with the third set of physical network interfaces, and wherein the link module links the one or more third virtual network interfaces of the third set of virtual machines to the logical network.

6. The system of claim 1, wherein the link module links the first secured logical component to a network, the security module identifies the set of security policies for one or more communications received via the network to the first logical entity or one or more communications sent via the network from the first logical entity, and the control module controls based on the set of security policies the one or more communications received via the network to the first logical entity or the one or more communications sent via the network from the first logical entity.

7. The system of claim 1, wherein the first logical entity is a first datacenter, the first secured logical component includes the link module, security module, and control module, and the link module links the first secured logical component to the second logical entity that is a second datacenter including the second set of virtual machines, wherein a second secured logical component is linked to the second datacenter, and the first and second secured logical components establish a secure connection and encrypt one or more communications between the first and second logical entities.

8. The system of claim 1, wherein the first logical entity is at least one of a datacenter, cluster, and virtual machine.

9. A method of providing security in a virtualization environment, the method comprising:
    linking, at a virtual machine running on a host machine, a first secured logical component to a first logical entity including a first set of virtual machines;
    identifying a network interface of the first secured logical component;
    linking a logical network associated with the first logical entity to the network interface;
    linking the first secured logical component to a second logical entity including a second set of virtual machines;
    linking the logical network associated with the second logical entity to the network interface;
    identifying, at the virtual machine, a set of security policies for one or more communications between the first logical entity and the second logical entity;
    identifying a first set of host machines associated with the second logical entity, the first set of host machines running the second set of virtual machines and including a first set of physical network interfaces;
    identifying one or more virtual network interfaces associated with the second set of virtual machines and the first set of physical network interfaces;
    linking the one or more virtual network interfaces of the second set of virtual machines to the logical network;
    identifying a second set of host machines associated with the first logical entity, the second set of host machines running the first set of virtual machines and including a second set of physical network interfaces;
    identifying one or more virtual network interfaces associated with the first set of virtual machines and the second set of physical network interfaces; and
    linking the one or more virtual network interfaces of the first set of virtual machines to the logical network; and
    controlling, based on the set of security policies, the one or more communications between the first logical entity and the second logical entity,
    wherein the first secured logical component runs on a virtual machine running on a host machine of the first set of host machines and receives communications via a physical network interface of the first set of physical network interfaces, wherein the virtual machine is migrated to a host machine of the second set of host machines, and after migration, the virtual machine receives communications via a physical network interface of the second set of physical network interfaces.

10. The method of claim 9, further comprising:
    unlinking the first secured logical component from the second logical entity;

linking the first secured logical component to a third
logical entity including a third set of virtual machines;
identifying a second set of security policies for one or
more communications between the first logical entity
and the third logical entity;
controlling, based on the second set of security policies,
one or more communications between the first logical
entity and the third logical entity;
linking the logical network associated with the third
logical entity to the network interface;
identifying a third set of host machines associated with
the third logical entity, the third set of host machines
running the third set of virtual machines and including
a third set of physical network interfaces;
identifying one or more virtual network interfaces associated with the third set of virtual machines and the
third set of physical network interfaces; and
linking the one or more virtual network interfaces of the
third set of virtual machines to the logical network.

11. The method of claim 9, further comprising:
linking the first secured logical component to a network,
wherein the identifying a set of security policies
includes identifying the set of security policies for one
or more communications received via the network to
the first logical entity or one or more communications
sent via the network from the first logical entity, and the
controlling includes controlling, based on the set of
security policies, the one or more communications
received via the network to the first logical entity or the
one or more communications sent via the network from
the first logical entity.

12. The method of claim 9, wherein the first logical entity
is a first datacenter, the method further comprising:
linking the first secured logical component to the second
logical entity, the second logical entity being a second
datacenter including the second set of virtual machines
and being linked to a second secured logical component;
establishing a secure connection with the second secured
logical component;
encrypting one or more communications between the first
and second logical entities; and
sending the encrypted one or more communications.

13. A non-transitory machine-readable medium comprising a plurality of machine-readable instructions that when
executed by one or more processors is adapted to cause the
one or more processors to perform a method comprising:
linking a secured logical component to a logical entity
including a first set of virtual machines, the secured
logical component running on a virtual machine running on a first host machine;
identifying a set of security policies for one or more
communications to the logical entity or one or more
communications from the logical entity;
controlling, based on the set of security policies, the one
or more communications to the logical entity or the one
or more communications from the logical entity linking, at a virtual machine running on a host machine, a
first secured logical component to a first logical entity
including a first set of virtual machines;
identifying a network interface of the first secured logical
component;
linking a logical network associated with the first logical
entity to the network interface;
linking the first secured logical component to a second
logical entity including a second set of virtual
machines;
linking the logical network associated with the second
logical entity to the network interface;
identifying, at the virtual machine, a set of security
policies for one or more communications between the
first logical entity and the second logical entity;
identifying a first set of host machines associated with the
second logical entity, the first set of host machines
running the second set of virtual machines and including a first set of physical network interfaces;
identifying one or more virtual network interfaces associated with the second set of virtual machines and the
first set of physical network interfaces;
linking the one or more virtual network interfaces of the
second set of virtual machines to the logical network;
identifying a second set of host machines associated with
the first logical entity, the second set of host machines
running the first set of virtual machines and including
a second set of physical network interfaces;
identifying one or more virtual network interfaces associated with the first set of virtual machines and the
second set of physical network interfaces; and
linking the one or more virtual network interfaces of the
first set of virtual machines to the logical network; and
controlling, based on the set of security policies, the one
or more communications between the first logical entity
and the second logical entity,
wherein the secured logical component runs on a virtual
machine running on a host machine of the first set of
host machines and receives communications via a
physical network interface of the first set of physical
network interfaces, wherein the virtual machine is
migrated to a host machine of the second set of host
machines, and after migration, the virtual machine
receives communications via a physical network interface of the second set of physical network interfaces.

14. The non-transitory machine-readable medium of
claim 13, the method further comprising:
unlinking the first secured logical component from the
second logical entity;
linking the first secured logical component to a third
logical entity including a third set of virtual machines;
identifying a second set of security policies for one or
more communications between the first logical entity
and the third logical entity;
controlling, based on the second set of security policies,
one or more communications between the first logical
entity and the third logical entity;
linking the logical network associated with the third
logical entity to the network interface;
identifying a third set of host machines associated with
the third logical entity, the third set of host machines
running the third set of virtual machines and including
a third set of physical network interfaces;
identifying one or more virtual network interfaces associated with the third set of virtual machines and the
third set of physical network interfaces; and
linking the one or more virtual network interfaces of the
third set of virtual machines to the logical network.

15. The non-transitory machine-readable medium of
claim 13, the method further comprising:
linking the first secured logical component to a network,
wherein the identifying a set of security policies
includes identifying the set of security policies for one
or more communications received via the network to
the first logical entity or one or more communications
sent via the network from the first logical entity, and the
controlling includes controlling, based on the set of security policies, the one or more communications received via the network to the first logical entity or the one or more communications sent via the network from the first logical entity.

16. The non-transitory machine-readable medium of claim 13, wherein the first logical entity is a first datacenter.

17. The non-transitory machine-readable medium of claim 16, the method further comprising:
- linking the first secured logical component to the second logical entity, the second logical entity being a second datacenter including the second set of virtual machines and being linked to a second secured logical component;
- establishing a secure connection with the second secured logical component;
- encrypting one or more communications between the first and second logical entities; and
- sending the encrypted one or more communications.

\* \* \* \* \*